Oct. 7, 1941.                L. D. WALTER                2,258,271
                    LIQUID FLOW CONTROL APPARATUS
                      Filed Sept. 8, 1939           2 Sheets-Sheet 1
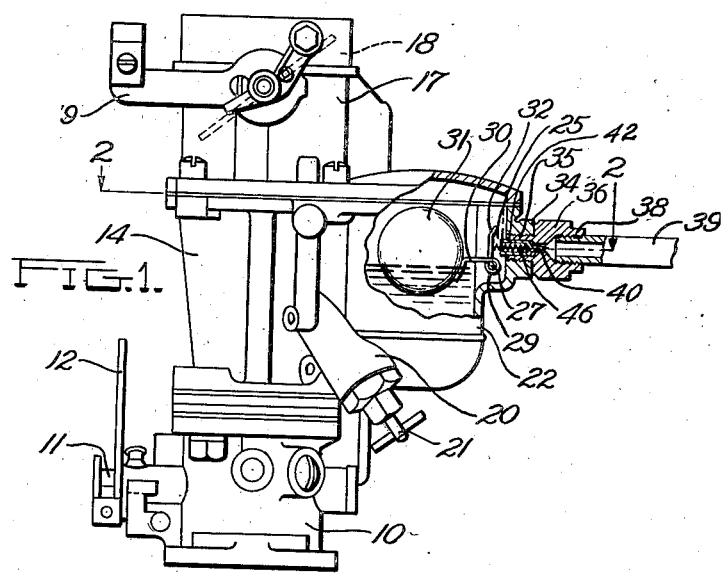
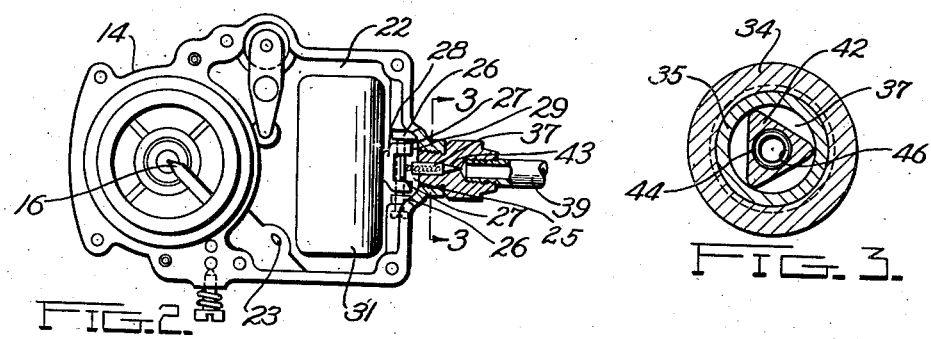
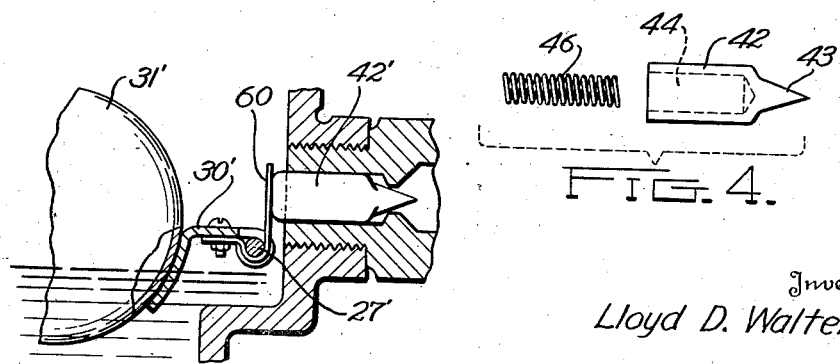
Inventor
Lloyd D. Walter
By Broselton, Whitcomb & Davies
Attorney Oct. 7, 1941.    L. D. WALTER    2,258,271
LIQUID FLOW CONTROL APPARATUS
Filed Sept. 8, 1939    2 Sheets-Sheet 2
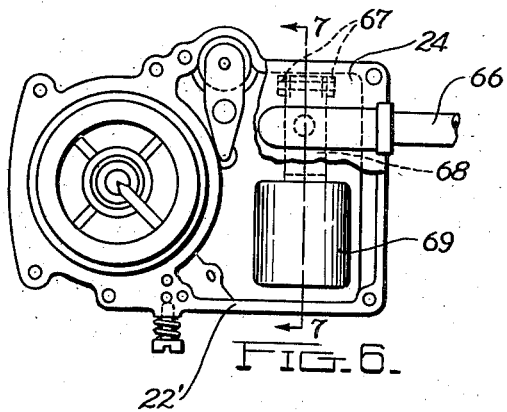
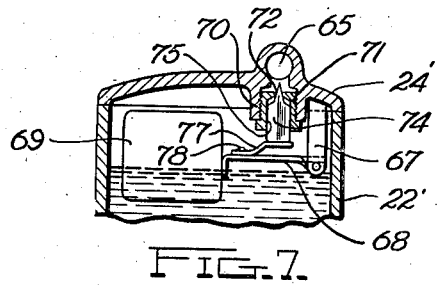
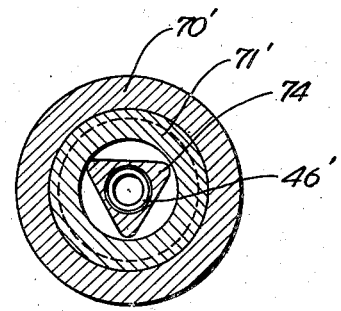
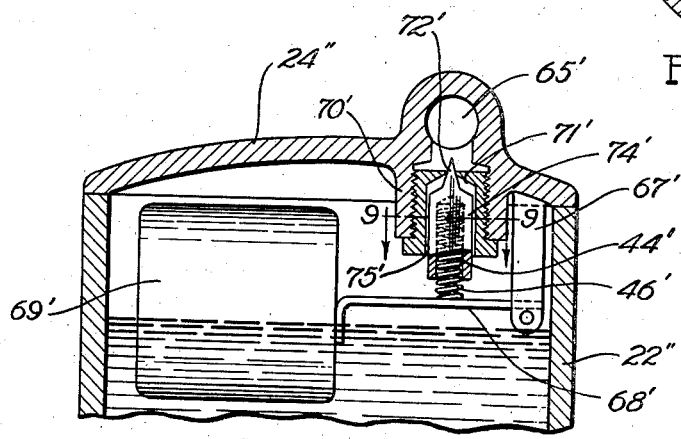
Inventor
Lloyd D. Walter
By Braselton, Whitcomb Davis
Attorneys Patented Oct. 7, 1941

2,258,271

UNITED STATES PATENT OFFICE 2,258,271

LIQUID FLOW CONTROL APPARATUS

Lloyd D. Walter, Toledo, Ohio, assignor to The Tillotson Manufacturing Company, Toledo, Ohio, a corporation of Ohio Application September 8, 1939, Serial No. 293,981

3 Claims. (Cl. 137—104)

This invention relates to liquid flow controlling means and more especially to means for regulating the flow of fuel into carburetors for use with internal combustion engines, and is a continuation in part of my copending application Serial No. 248,474, filed December 30, 1938.

The invention has for an object the provision of valve arrangement whereby the level of liquid is maintained in a receptacle at a substantially constant level irrespective of sudden movements of the receptacle.

A further object of the invention resides in a means interposed between a valve member and a float member for absorbing or damping vibrations of the float member.

Another object of the invention is the provision of shock absorbing means interposed between a needle valve and a float member in the float controlling means for carburetors whereby shocks imparted to the carburetor by reason of road or engine vibrations are absorbed and do not affect the liquid control valve whereby liquid is maintained in a substantially constant level in the float chamber of the carburetor.

Still a further object of the invention resides in the provision of a liquid level controlling mechanism for carburetors incorporating a shock absorbing means between the valve and the float member wherein the mechanism is carried by a removable cover to thus facilitate assembly, inspection and repair.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 1 is a side elevational view of a carburetor for use with an internal combustion engine showing portions of the wall of the float chamber broken away for purposes of illustration of the liquid flow controlling valve means of my invention;

Figure 2 is a sectional plan view taken substantially on a line 2—2 of Figure 1;

Figure 3 is a sectional view taken substantially on a line 3—3 of Figure 2;

Figure 4 is a view illustrating one form of needle valve and spring arrangement of my invention;

Figure 5 is a fragmentary view of a liquid receptacle and float control valve arrangement showing a modified form of the invention;

Figure 6 is a top plan view of carburetor showing a modified arrangement of my invention;

Figure 7 is a sectional view taken substantially on the line 7—7 of Figure 6;

Figure 8 is an enlarged sectional view similar to Figure 7 showing a further form of the invention;

Figure 9 is an enlarged horizontal sectional view taken substantially on the line 9—9 of Figure 8.

It is to be understood that while I have shown the fluid control arrangement of my invention as utilized for controlling the fuel level of carburetors used with internal combustion engines, it is to be understood that I contemplate the use of the invention wherever the same may be found to have utility.

Referring to the drawings in detail and particularly Figures 1 and 2, there is illustrated a carburetor of the so-called "down draft" type for an internal combustion engine composed of three principal sections, a lower section 10, a central section 14 forming a mixing passage, and an upper section 17. The lower section or casing 10 is adapted for connection to a manifold (not shown) of the engine. Within the casing is diametrically positioned a shaft 11 and fixed thereon is a throttle valve (not shown) for regulating the amount of fuel mixture passing from the carburetor to the intake manifold, the shaft 11 and the throttle valve being controlled by means of a lever 12 and suitable linkage (not shown). Positioned above the casing 10 is the main or central section 14 forming a mixing passage into which extends a suitable fuel delivery nozzle 16. Secured to the upper portion of housing 14 is the tubular section 17 within which is mounted a choke valve 18 which is for the purpose of regulating the amount of air admitted to the mixing chamber within the housing 14. The housing 14 is provided with a tubular portion 20 within which is arranged metering needle 21 for the fuel delivery nozzle to regulate the amount of fuel which may pass from the fuel chamber 22 into the fuel nozzle 16 through a channel 23.

As particularly shown in Figure 2, the fuel receptacle or chamber 22 is of substantially rectangular configuration in cross section and one wall of the chamber 22 is formed with a depression or recess 25, the opposing walls of the depression having aligned bosses 26 which are bored to receive a short shaft or pin 27. Pivotally mounted upon the pin 27 is a float supporting element 28 having ear portions 29 surrounding the pin 27, the element 28 having an extension 30 to which is secured a substantially cylindrical float member 31. The float member is preferably secured to the extension 30 by means of solder or other suitable securing means. In the embodiment illustrated the float member 31 is of hollow configuration and is fabricated of brass or other suitable material which will be substantially unaffected by hydro-carbon fuels and the like. The float member 31 is hermetically sealed so that it will at all times be elevated by the influx of fuel into the fuel chamber. Other types of float may be employed without departing from the spirit of the invention.

The exterior wall portion of the fuel chamber adjacent the depression 25 is formed into a cylindrical boss portion which is interiorly bored and threaded to receive a threaded portion 35 of a fitting 36, the fitting having a passage therethrough to conduct fuel into the fuel chamber 22. The fitting is interiorly threaded as at 38 to receive the threaded extremity of a tube or conduit 39, the latter being connected through a fuel pump (not shown) to a source of fuel supply or if a gravity feed system is used, is connected directly to a tank positioned above the fuel chamber of the carburetor. The passage in the fitting 36 is provided with a restriction 40, the restriction having a comparatively small opening to admit the passage of fuel. Positioned in the bore of the fitting is a valve member 42 being inclusive of a needle valve portion 43 normally projecting into the valve seat or restriction 40 of the fitting to regulate the flow of fuel into the fuel chamber and a shank portion 42. It is to be noted as particularly shown in Figure 4 that the shank portion 42 of the valve member is of non-circular cross section in the form shown, the member being of triangular configuration for properly centering the needle valve portion 43 with respect to the valve seat 40 and reducing the friction of the valve member within the cylindrical bore 37 in the fitting 36 by permitting the fuel to flow substantially unrestricted into the fuel chamber after passing the needle valve section 43. The shank 42 of the valve member is provided with a central bore 44 and positioned in the bore of the valve is a resilient means in the form of an expansive coil spring 46, the spring 46 being of such length that a portion thereof extends toward the fuel chamber beyond the end of the valve member 42. In the form of the invention of Figures 1 and 2, the float supporting member 28 is provided with an upwardly extending arm 32 which is adapted for engagement with the portion of the spring 46 projecting from the valve member 42.

It is to be noted that when the fuel level in the chamber 22 is at substantially the height shown in Figure 1 or at a predetermined height determined by the size and weight of the float member 31, the arm 32 contacting with the spring 46 exerts a pressure upon valve member 42 tending to force the needle portion 43 thereof into the opening in the restriction 40 of the fitting to cut off the flow of fuel into the fuel chamber. The amount of pressure acting upon the spring 46 is dependent upon the position of buoyancy of the float member 31 and when there is a low level of fuel in the fuel chamber the float member 31 will be moved from the position shown in Figure 1 downwardly in a counter-clockwise arc about the pin 27 causing the arm 32 to move away from spring 46 and reducing the pressure upon valve member 42. The head of fuel acting upon the fuel in conduit 39 either by gravity from a tank positioned above the carburetor or by a fuel pump exerting a pressure upon the fuel will force the needle portion 43 of the valve away from its seat and permit fuel to flow into the chamber until the float 31 is elevated by the fuel sufficiently to cause arm 32 to exert sufficient pressure through the spring 46 to the shank 42 of the valve member to cause the needle portion 43 to close the fuel ingress passage and prevent further flow of fuel into the chamber.

One of the particular features of this invention resides in the spring or resilient means 46 being positioned between the float support and the valve member which provides a shock absorbing or damping means. When the carburetor is used with an internal combustion engine in an automotive vehicle or other installation where the carburetor is subject to sudden movements caused by road irregularities, vibrations, or the like, such sudden movement causes a motion of fuel in the chamber with a consequent vertical movement of the float member 31. By the interpositioning of the resilient means 46 between the float support and the valve member, such vibratory movements of the float member are substantially all absorbed by the spring 46 and therefore are not transmitted to the needle valve 43 so that during sudden movements of the carburetor no fuel passes the valve member even though the float member 31 is subjected to sudden vertical movements, which would otherwise affect the valve member to permit periodic deliveries of fuel into the fuel chamber which would abnormally raise the fuel level. Thus, with this invention a means is provided whereby the fuel level in the fuel chamber will remain substantially at a predetermined height irrespective of sudden movements of the carburetor, this result being obtained by the use of the shock absorbing or damping resilient means between the valve member and the float mechanism.

Figure 5 illustrates a modified form of the invention wherein the resilient means comprises a spring plate 60 riveted or otherwise secured to the extension 30' of the float supporting means which carries the float 31'. In this form of the invention, the end of valve member 42', which is similar in construction to valve member 42 but need not be bored as in the form shown in Figure 4, contacts with the resilient or spring plate 60 so that as the fuel level rises in the float chamber to predetermined height the float support moving clockwise about pivot pin 27' brings the spring plate 60 into contact with the end of the valve member 42' to close the fuel passage. The plate 60 being formed of flexible material will permit vibratory limited vertical movements of float member 31' without allowing the opening of valve 42' to permit fuel to flow into the fuel chamber.

In both forms of the invention, as the fuel level falls in the float chamber due to fuel being delivered to the internal combustion engine with which the device may be used, the float moves downwardly and the pressure upon the spring holding the valve in closed position is thereby lessened and under the pressure of the fuel in the inlet conduit, the valve is opened and the amount of fuel in the receptacle raised to the predetermined level when the pressure on the valve is again sufficient to close the same.

Figures 6 and 7 illustrate a form of the invention wherein the carburetor fuel chamber 22' is provided with a cover 24' which is formed with a fuel inlet 65 communicating with the tube 66. The cover 24' is provided with a depending projection 67 and pivoted to the lower end of projection 67 is a float supporting member 68 which is connected to a float 69. The cover is also formed with a boss portion 70 into which projects a threaded fitting 71 which has a comparatively small orifice 72 to permit the flow of liquid from the inlet 65 through the fitting 71 into the fuel receptacle 22'.

In this form of the invention, the body portion of the needle valve 74 projects into a bore 75 in the fitting 71. Interposed between the float supporting member 68 and the extremity of the valve 74 is a resilient or spring plate 77 which is riveted or otherwise secured as at 78 to the float supporting member. Thus, as the float 69 is elevated by the flow of fluid into the chamber 22', the resilient or flexible plate 77 applies the buoyant pressure against the needle valve 74 to regulate the flow of fluid into the chamber.

Figures 8 and 9 illustrate a form of the invention similar to that shown in Figures 6 and 7, the carburetor fuel chamber having a cover 24'' formed with a fuel inlet 65'. The cover 24'' is provided with a depending projection 67' to the lower end of which is pivotally supported a float means being inclusive of a member 68' to the outer end of which is connected a float 69'. The cover 24'' is formed with a boss portion 70' which is bored and interiorly threaded to receive a fitting 71' formed with a comparatively small orifice 72' through which the fuel or liquid may pass from the inlet 65' into the fuel receptacle 22''.

In this form of the invention a needle valve 74' similar in construction to needle valve 42 as illustrated in Figure 4 is employed and projects into a bore 75' in the fitting 71'. The needle valve in this form is of triangular cross section as shown in Figure 9, and is centrally bored as at 44' to accommodate a comparatively weak expansive coil spring 46' which forms a resilient means between the needle valve and the float means, the spring normally being in engagement with the arm 68' as shown in Figure 8 when the fuel in the receptacle 22' is at normal level. Thus, as the float 69' moves downwardly when the fuel level is lowered, the force acting upon spring 46' is decreased permitting the needle valve 72' to move away from its seat and permit the flow of fuel through the orifice 72' and between the interior walls of fitting 71' and the exterior walls of the body of the valve into the receptacle 22''. When the fuel level is at normal and the float means is caused to vibrate by means of vibration of the vehicle, the vibration will be absorbed by the spring 46' so that the valve 72' will not be forced from its seat and thus prevent the fuel level from rising above its normal level.

It is apparent that within the scope of the invention, modifications and different arrangements may be made other than is herein disclosed, the present disclosure being illustrative only.

What I claim is:

1. In a carburetor, in combination, a fuel chamber; a float pivotally supported in said fuel chamber, said float having an upwardly projecting arm; a fuel inlet tube communicating with said receptacle, said tube having a restriction therein; a needle valve cooperating with said restriction, said needle valve having a non-circular cross section to accommodate the passage of fuel past said valve, said valve having a bore; a coil spring positioned in the bore of said valve and normally in contact with the arm of said float means whereby the float means at normal fuel level in said chamber exerts a pressure upon said spring to hold the needle valve in closed position.

2. In a carburetor, liquid level controlling means comprising, in combination, a fuel chamber; a removable cover for said chamber; a conduit connected to said cover for conveying fuel into said chamber; float means positioned in said chamber; a needle valve arranged to close the fuel conveying conduit, said needle valve having a non-circular body portion and a centrally positioned longitudinally extending bore therein; a coil spring positioned in the bore of said valve and normally in contact with said float means whereby the float means at normal fuel level in said chamber exerts a pressure upon said spring to hold the needle valve in closed position.

3. In a carburetor, liquid level controlling means comprising, in combination, a fuel chamber; a removable cover for said chamber; a conduit connected to said cover for conveying fuel into said chamber; a member pivotally supported upon said cover; a float secured to said member; said fuel conveying conduit having a restriction therein; a valve member having a non-circular body portion positioned adjacent said restriction and arranged to accommodate the passage of fuel past said valve, the body of said valve having a bore therein; a coil spring positioned in the bore of said valve and having a portion projecting therefrom and in contact with the member supporting said float means.

LLOYD D. WALTER.